US008693189B2

(12) United States Patent
Thomas

(10) Patent No.: US 8,693,189 B2
(45) Date of Patent: Apr. 8, 2014

(54) CASE FOR A TABLET COMPUTER

(76) Inventor: Gregory Thomas, Arlington Heights, IL (US)

( * ) Notice: Subject to any disclaimer, the term of this patent is extended or adjusted under 35 U.S.C. 154(b) by 214 days.

(21) Appl. No.: 13/411,986

(22) Filed: Mar. 5, 2012

(65) Prior Publication Data
US 2013/0229772 A1 Sep. 5, 2013

(51) Int. Cl.
*G06F 1/16* (2006.01)
*B65D 85/00* (2006.01)

(52) U.S. Cl.
USPC ............................... 361/679.56; 206/320

(58) Field of Classification Search
USPC ..................... 361/679.56; 206/320
See application file for complete search history.

(56) References Cited

U.S. PATENT DOCUMENTS

| | | | |
|---|---|---|---|
| 5,675,524 A * | 10/1997 | Bernard | 361/679.56 |
| 7,889,498 B2 * | 2/2011 | Diebel et al. | 361/679.56 |
| 8,467,179 B2 * | 6/2013 | Probst et al. | 361/679.56 |
| 8,467,183 B2 * | 6/2013 | Probst et al. | 361/679.56 |
| 2011/0297566 A1 * | 12/2011 | Gallagher et al. | 206/320 |
| 2012/0043234 A1 * | 2/2012 | Westrup | 206/320 |
| 2012/0228169 A1 * | 9/2012 | Huang | 206/320 |
| 2012/0300394 A1 * | 11/2012 | Norfolk | 206/320 |

* cited by examiner

*Primary Examiner* — Lisa Lea Edmonds
(74) *Attorney, Agent, or Firm* — Posz Law Group, PLC

(57) ABSTRACT

A case is provided for a tablet computer, comprising: a tablet securing unit configured to hold a tablet computer in a tablet cavity; one or more hand grips on a first end of the tablet securing unit, the one or more hand grips extending from the tablet securing unit; a palette grip located in the middle of the first end of the tablet securing unit and extending from the tablet securing unit, the palate grip having a hole; a handle connected to the one or more hand grips; a support beam formed on a back side of the tablet securing unit, the support beam being configured to support the tablet computer; and a rubber lip formed on a front side of the tablet securing unit around a periphery of the tablet cavity, the rubber lip being configured to hold the tablet computer in the tablet cavity against the support beam.

22 Claims, 7 Drawing Sheets

CASE FOR A TABLET COMPUTER

FIELD OF THE INVENTION

The present claimed invention relates to a case for a tablet computer. More specifically, the present claimed invention relates to a case for a tablet computer that allows for convenient extended use.

BACKGROUND OF THE INVENTION

A tablet computer is a hand-held computer that bridges the gap between a laptop computer and a smart phone. Tablet computers are typically smaller than a laptop and generally do not have a full keyboard, using another method of data input such as a touchscreen or a pen-enabled interface. However, tablet computers are larger than smart phones, allowing for more memory and greater display sizes, as well as easier data entry. Examples of existing tablet computers include: the Apple iPad, the BlackBerry Playbook, the Hewlett-Packard TouchPad, the Motorola Zoom, and the Kindle Fire.

One typical benefit of tablet computers is their portability. They are typically designed to have a manageable size and weight, and to use a rechargeable battery, allowing them to be carried around by their user. In home use, this allows them to be used in any location, in bed, on the sofa, at the table, without need for a plug, a keyboard, or a mouse. This portability also offers many options for business use as well.

However, while tablet computers are extremely portable, this can lead to problems as well. In particular, because they are so portable, they can be easily dropped, set down and forgotten, misplaced, etc. this can be particularly troublesome in a work environment where the tablet computer may contain sensitive information, or allow access to financial transactions. Thus As tablet computers become more prevalent, businesses may wish to use them in the course of providing services. For example, tablet computers can be used to take orders at restaurants; they can be used as mobile cashier locations; they can allow for on-the-spot technical support; they can be used for inventory control; etc. Such implementations may require an employee to have a tablet computer on hand either at all times or frequently. However, conventional tablet computers offer no easy way to be held for a long period of time, and they are prone to being dropped, lost, or misplaced.

It would therefore be desirable to provide a case for a tablet computer that will facilitate carrying the tablet computer for long periods of time with constant or intermittent use.

SUMMARY OF THE INVENTION

A case is provided for a tablet computer, comprising: a tablet securing unit configured to hold a tablet computer in a tablet cavity; one or more hand grips on a first end of the tablet securing unit, the one or more hand grips extending from the tablet securing unit; a palette grip located in the middle of the first end of the tablet securing unit and extending from the tablet securing unit, the palate grip having a hole formed in it; a handle connected to the one or more hand grips; a support element formed on a back side of the tablet securing unit, the support element being configured to support the tablet computer; and a rubber lip formed on a front side of the tablet securing unit around a periphery of the tablet cavity, the rubber lip being configured to hold the tablet computer in the tablet cavity against the support element.

The tablet securing unit and the support element may be configured such that when the tablet computer is placed in the tablet cavity, a bottom of the tablet computer is flush with the support element.

The case may further comprise one or more external docking connectors located on a tip of the one or more hand grips, the one or more external docking connectors configured to connect to a docking station.

The one or more hand grips may have a length between 3 and 5 inches, and an average width of between 0.5 and 1.5 inches. The hole may have a length between 1 and 2 inches, and a width of between 0.5 and 1.5 inches.

The case may further comprise a tablet docking connector formed along a periphery of the tablet securing unit, the tablet docking connector being configured to connect to a tablet docking port on the tablet computer.

The one or more hand grips may comprise first and second hand grips, the first hand grip may be formed on a first side of the first end of the tablet securing unit, the second hand grip may be formed on a second side of the first end of the tablet securing unit, and the handle may be formed between the first hand grip and the second hand grip.

The handle may be secured to the first hand grip by a hinge element, and the handle may be configured to be releasably attached to the second hand grip by a latching element.

The case may further comprise a shoulder strap connected to the handle, the strap being configured to hang over a shoulder of a person. The case may further comprise a stabilizing strap that is shorter than the shoulder strap, the stabilizing strap being connected between two points of the shoulder strap.

A case is provided for a tablet computer, comprising: a tablet securing unit configured to hold a tablet computer in a tablet cavity, the tablet securing unit being formed of separate first and second portions, the first and second portions defining the tablet cavity; a securing mechanism configured to secure the first portion to the second portion; one or more hand grips projecting from the first portion of the tablet securing unit; a palette grip located in the middle of one end of the first portion of the tablet securing unit and extending from the tablet securing unit, the palate grip having a hole formed in it; and a handle connected to the one or more hand grips, wherein at least a portion of a side of the first and second portions of the tablet securing unit are configured such that the portion of the side facing the tablet cavity conforms with a contour of the tablet computer placed within the tablet cavity.

The tablet securing unit may be configured such that when the tablet computer is placed in the tablet cavity, a bottom of the tablet computer is flush with a bottom of the tablet securing unit.

The case may further comprise one or more external docking connectors located on a tip of the one or more hand grips, the one or more external docking connectors configured to connect to a docking station The one or more hand grips may have a length between 3 and 5 inches, and an average width of between 0.5 and 1.5 inches. The hole may have a length between 1 and 2 inches, and a width of between 0.5 and 1.5 inches.

The case may further comprise a tablet docking connector formed along a periphery of the tablet securing unit, the tablet docking connector being configured to connect to a tablet docking port on the tablet computer.

The one or more hand grips may comprise first and second hand grips, the first hand grip may be formed on a first side of the first end of the tablet securing unit, the second hand grip may be formed on a second side of the first end of the tablet securing unit, and the handle may be formed between the first hand grip and the second hand grip.

The handle may be secured to the first hand grip by a hinge element, and the handle may be configured to be releasably attached to the second hand grip by a latching element.

The case may further comprise a shoulder strap connected to the handle, the strap being configured to hang over a shoulder of a person. The case may further comprise a stabilizing strap that is shorter than the shoulder strap, the stabilizing strap being connected between two points of the shoulder strap.

A tablet computer unit is provided comprising a table computer secured in the case for a table computer.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Figure 1A:
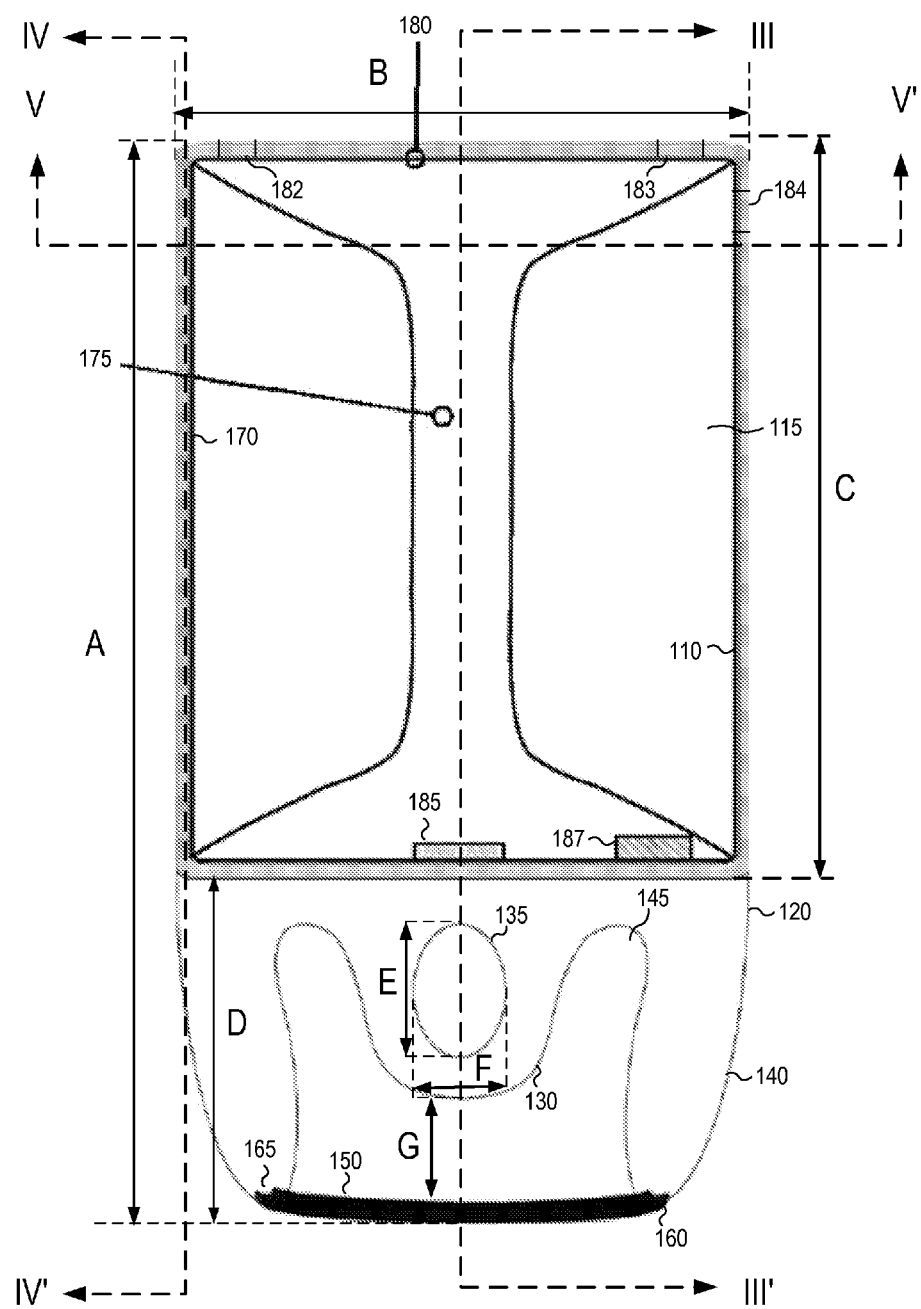
FIG. 1A is a top view of a case for a tablet computer without a tablet computer inserted according to a first disclosed embodiment.

FIG. 1A is a top view of a case for a tablet computer without a tablet computer inserted according to a first disclosed embodiment. As shown in FIG. 1A, the case 100 includes a tablet securing unit 110 and a handling unit 120. The tablet securing unit 110 includes a tablet cavity 115 that is configured to hold one or more types of tablet computer. The handling unit 120 includes a palette grip 130 having a hole 135, a handgrip 140, a gap 145 between the palette grip 130 and the handgrip 140, a handle 150, a hinge 160, and a securing mechanism 165. In the first embodiment, the tablet securing unit 110 further includes a side portion 170, a back portion 175 a rubber lip 180, a headphone jack opening 182, an on/off switch opening 183, a volume control opening 184, a docking opening 185, and a speaker opening 187.

The tablet securing unit 110 is provided to secure a tablet computer into the case 100. It is configured to hold the tablet computer securely so that the case 100 can be moved and operated without danger of the tablet computer falling out of the tablet securing unit 110.

The tablet cavity 115 is configured to hold one or more types of tablet computer. In some embodiments the tablet cavity 115 may be specifically tailored to a particular tablet computer. In other embodiments the tablet cavity 115 may be configured to accept multiple types of tablet computer.

In this embodiment, the tablet cavity is defined by side portions 170 of the tablet securing unit 110, the back portion 175 of the tablet securing unit 110, and a plane formed between the inner circumference of the rubber lip 180.

The handling unit 120 is provided to give the user of the tablet computer greater options for holding and using the tablet computer. It includes multiple elements that can be grasped or held in different manners.

The palette grip 130 is provided to allow a user to hold the case 100 in a convenient and ergonomically comfortable manner. In particular, the palette grip 130 includes a hole 135 through which one or more fingers or a thumb can be placed. For example, by placing the thumb through the hole 135 in the palette grip 130, a user can cradle the case 100, including the tablet, along the arm between elbow and wrist. The case 100 is held securely in this manner, with the crook of the elbow holding one side of the case 100 steady, while the thumb in the hole 135 in the palette grip 130 holds the other end of the case 100 steady. This allows the user more freedom to concentrate on reading data from the tablet computer, or entering data into the tablet computer, without having to worry about dropping it.

In one disclosed embodiment the hole 135 has a length E between 1.0 and 2.0 inches and a width F between 0.5 and 1.5 inches. However, alternate embodiments can use a smaller or larger hole as appropriate. For example, a case 100 designed for use with children might employ a smaller hole, with a correspondingly smaller length and width.

The handgrip 140 can be either a single handgrip 140 or a pair of handgrips 140 on either side of the handling unit 120. In the disclosed embodiment to handgrips 140 are provided.

However, in alternate embodiments a single handgrip 140 could be used, or more than two handgrips 140 could be provided.

Each handgrip 140 is configured such that it can easily be grasped by a user's hand. This allows the case 100 to be grabbed, picked up, or simply held with a firm grip of a clasped hand around the handgrip 140, rather than requiring a user to grab the edge of the tablet computer.

In one disclosed embodiment the handgrips 140 have a length D between 3 and 5 inches, and an average width of between 0.5 and 1.5 inches. However, alternate embodiments can provide for a bigger or smaller handgrip 140. For example a case 100 designed for use with children might employ a smaller handgrip 140 with a correspondingly smaller length and width The gap 145 between the palette grip 130 and the handgrip 140 can vary in length as well. However, the gap 145 should be of sufficient size to allow at least a portion of a user's hand to reach through it, since a user grasping a handgrip 140 must be able to fit his fingers or thumb through the gap 145.

The handle 150 is provided to allow yet another way for the case 100 to be carried or manipulated. In particular, the handle 150 allows the entire case 100 to be carried in the style of a briefcase or suitcase. A user can simply grasp the handle 150 with one hand and allow the remainder of the case 100 to dangle below. Again, the gap 145 between the palette grip and the handgrips 140 should be of sufficient size to allow the users fingers to wrap around the handle 150.

In this disclosed embodiment, the handle 150 can be swiveled around the hinge 160, located on one handgrip 140, to open the gap 145. Likewise, the handle 150 can be secured to a securing mechanism 165, located on the other handgrip 140. When secured, the handle 150 should be capable of supporting the entire weight of the case 100, including a tablet computer without coming unlatched. As a result, both the hinge 160 and the securing mechanism 165 should be strong enough to sustain that weight.

In alternate embodiments, however, the handle 150 may be made completely detachable, in which case the hinge 160 could be replaced by a second securing mechanism. Similarly, in other embodiments, the handle 150 could be securely attached to one or more handgrips 140 without the ability to move.

The side portions 170 of the tablet securing unit in this embodiment operate to hold the tablet computer in place horizontally with respect to the case 100. The edges of the tablet computer will rest up against the side portions 170, holding it in place so that it cannot move laterally.

The back portion 175 in this embodiment serves as a support element to hold the tablet computer in place vertically with respect to the case. In particular, the tablet computer will rest on the back portion 175, and cannot fall through. In this embodiment the back portion 175 is an I-shaped support element that does not cover the entirety of a back plane area between the side portions 170. This is sufficient to keep the tablet computer from falling out of the tablet cavity 115, but uses less material, and makes for a lighter case 100. However, alternate embodiments could employ a back portion 170 of a different shape that covers a different part of the back plane, including one that covers the entire back plane. Some embodiments may even provide for a design on the back portion 170 in which a specific pattern, such as a logo, is cut out of the back portion 170.

The rubber lip 180 in this embodiment is provided around the edge of the side portions and extends partway into a front plane area between the side portions 170. The rubber lip 180 should be firm enough to keep the tablet computer from falling out of the tablet cavity 115 when its own weight is applied to the rubber lip 180 (e.g., when the case 100 is turned upside down or sideways and the tablet computer can press against the rubber lip 180. However, the rubber lip 180 should be supple enough that it can be pushed aside by a user to allow the tablet computer to be inserted into or removed from the tablet cavity 115.

The headphone jack opening 182 is provided at an appropriate location (e.g., at an upper left part of the side portion 170) to allow easy access to a headphone jack in the tablet computer. Such a headphone jack allows a user to plug in headphones to listen to the tablet computer's audio privately. The headphone jack opening 182 allows the user to plug in headphones even when the tablet computer is installed in the case 100.

The on/off switch opening 183 is provided at an appropriate location (e.g., at a upper right part of the side portion 170) to allow easy access to an on/off switch on the tablet computer. The on/off switch opening 183 allows the user to turn the tablet computer on and off even when the tablet computer is installed in the case 100.

The volume control opening 184 is provided at an appropriate location (e.g., at a upper right part of the side portion 170) to allow easy access to volume controls on the tablet computer. The volume control opening 183 allows the user to control the volume of the tablet computer even when the tablet computer is installed in the case 100.

The docking opening 185 is provided at an appropriate location (e.g., at a lower part of the back portion 175) to allow easy access to a docking port/connector in the tablet computer. Such a docking port/connector allows for charging of the tablet computer and data connection between the tablet computer and a remote computer.

The speaker opening 187 is provided at an appropriate location that corresponds to a speaker on the tablet computer (e.g., at a lower part of the back portion 175). It provides for unobstructed access to the tablet's speaker so that sound it provides will not be muffled.

In alternate embodiments that employs a different-shaped back portion 175, the docking opening 185 and the speaker opening 187 may be formed as part of a pattern, so that they will be less obvious. In such a case it may not be obvious to a user that these openings have been provided to allow access to a docking port/connector or a speaker.

Furthermore, although specific opening are described in specific locations for specific purposes, this is by way of example only. Different tablet computers will allow for different controls and different functions that may be located at different points on the table computer. As a result, it is intended that any kid of functional opening can be provided in the case 100, as needed, at a proper location corresponding to the necessary controls or operating device associated with that function on a given tablet computer. For example, in some tablet computers the on/off switch may be in a different location, requiring the on/off switch opening 183 to be in a different location. Alternately, a tablet computer might have a different function (e.g., a data port for connecting a Firewire connector) that requires an opening of a different size, location, or type.

In the first disclosed embodiment, the tablet securing unit 110 is a single unit, and the tablet computer is secured into the tablet cavity 115 by pushing it through the front plane of the tablet cavity 115, past the rubber lip 180. Once the tablet computer is in the tablet cavity 115 the combination of side portions 170, back portion 175, and rubber lip 180 operate to keep the tablet computer securely in place.

Figure 1B:
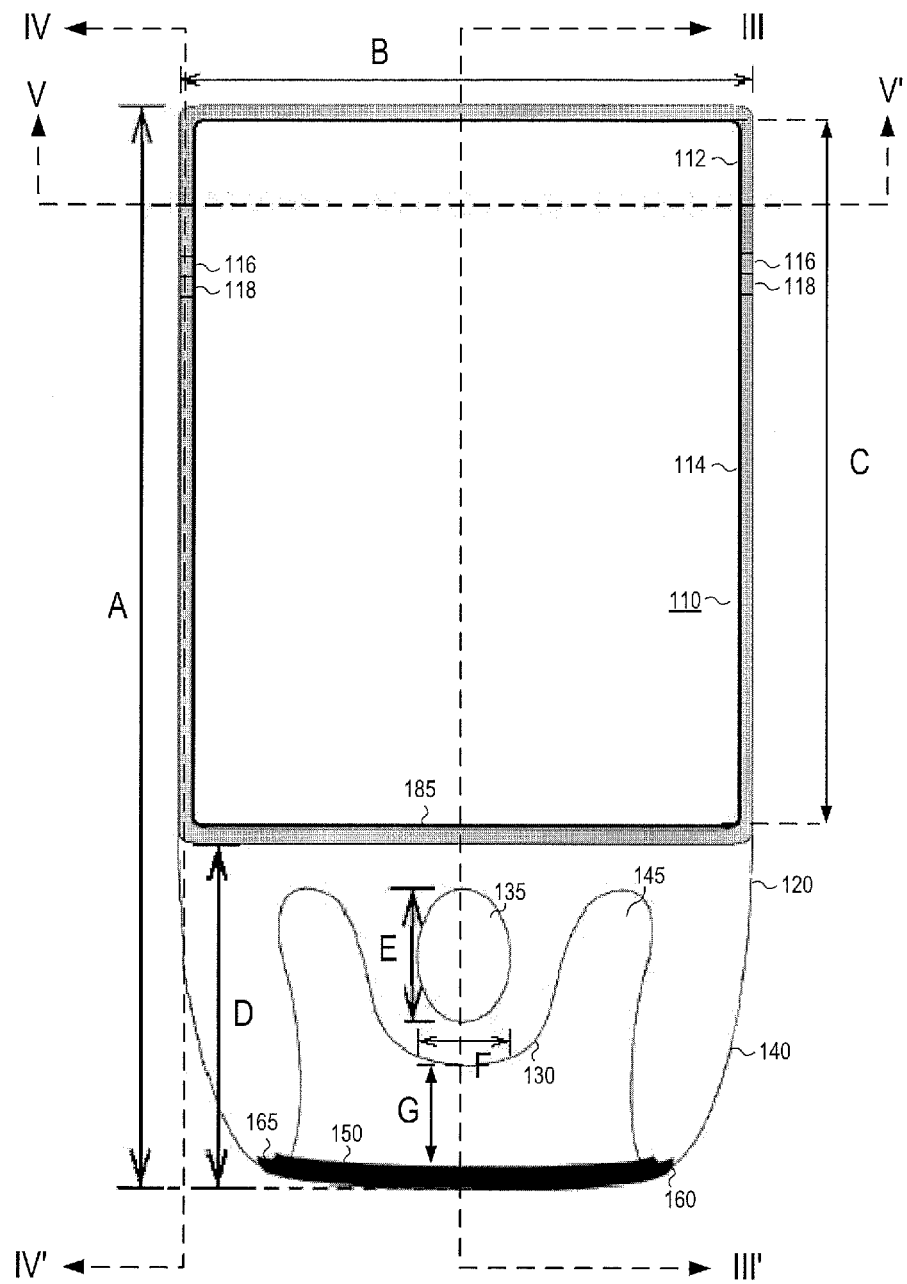
FIG. 1B is a top view of a case for a tablet computer without a tablet computer inserted according to a second disclosed embodiment.

FIG. 1B is a top view of a case for a tablet computer without a tablet computer inserted according to a second disclosed embodiment. As shown in FIG. 1B, the case 100 includes a tablet securing unit 110 and a handling unit 120. The tablet securing unit 110 includes an upper part 112, a lower part 114, and a tablet cavity 115 that is configured to hold one or more types of tablet computer. The handling unit 120 includes a palette grip 130 having a hole 135, a handgrip 140, a gap 145 between the palette grip 130 and the handgrip 140, a handle 150, a hinge 160, and a securing mechanism 165. In the second disclosed embodiment, the tablet securing unit 110 further includes a side portion 170.

Portions of the second disclosed embodiment that are the same or similar to the first disclosed embodiment will not be described. Only those portions that are different from the first disclosed embodiment will be addressed.

In the second disclosed embodiment, the tablet securing unit 110 is formed of two separate elements, an upper part 112 and a lower part 114. These two portions are detachable from each other, such that the upper part can be removed from the remainder of the case 100. In this embodiment, the lower part 114 is securely attached to the handling unit 120. However, in alternate embodiments the lower part 114 may be detachably connected to the handling unit 120.

The upper part 112 includes an upper securing mechanism 116, while the lower part 114 includes a lower securing mechanism 118. The upper and lower securing mechanisms 116 and 118 operate to secure the upper part 112 to the lower part 114 in a detachable manner. Different embodiments can employee a plug and socket, a clamp, a screw, or any other desirable attachment mechanism.

The side portions 170 in this embodiment are formed such that they fit around the edges of the tablet computer. They may be curved if the tablet computer has curved edges, or squared if the tablet computer has squared edges. However, they must operate to secure the tablet computer along all edges from movement in both a vertical and a horizontal direction.

In this embodiment, the tablet computer is secured into the tablet cavity 115 by removing the upper part 112 of the tablet securing unit 110 and sliding the tablet computer into the tablet cavity, making certain that it is engaged with the side portions 170. When the bottom of the tablet computer is engaged with the lowermost side portion 170, the upper part 112 of the tablet securing unit 110 is then inserted over the top of the tablet computer, and is engaged with the lower part 114 of the tablet securing unit 110 through the use of the attachment mechanisms 116 and 118. Once the tablet computer is in the tablet cavity 115, and the upper and lower parts 112 and 114 are secured to each other, the combination of the four side portions 170 operate to keep the tablet computer securely in place.

There is no need for a docking opening or a speaker opening in this embodiment because there is no back to tablet securing unit 110. Rather, that portion is open, allowing easy access to a docking port or a speaker.

Figure 2:
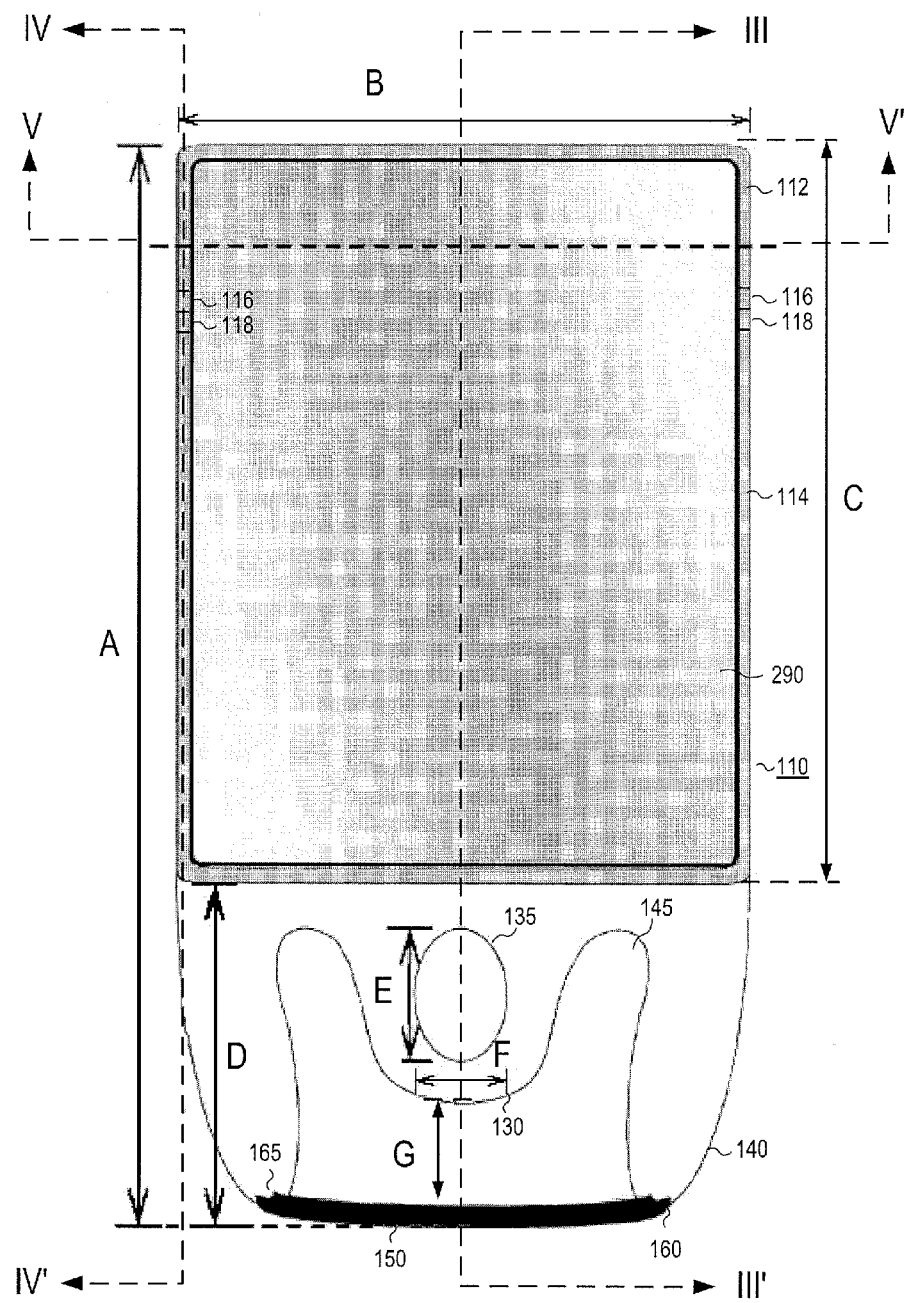
FIG. 2 is a top view of a case for a tablet computer with a tablet computer inserted according to the second disclosed embodiments.

FIG. 2 is a top view of a case for a tablet computer with a tablet computer inserted according to the second disclosed embodiments. This view is similar to that of FIG. 1B, save for the inclusion of a tablet computer 290. As shown in FIG. 2, the tablet computer 290 is inserted within the tablet securing unit 110.

In the embodiment shown in FIGS. 1A, 1B, and 2, certain measurements may be provided as a means of reference. In particular, the case 100 has a height A and a width B; the tablet securing unit 110 has a height C; the handling unit 120 has a height D; the hole 135 in the palette grip 130 has a height D and a width F; and the gap 145 between the palette grip 130 and the handle grip 140 has a distance G between the palette grip 130 and the handle 150.

Figure 3A:
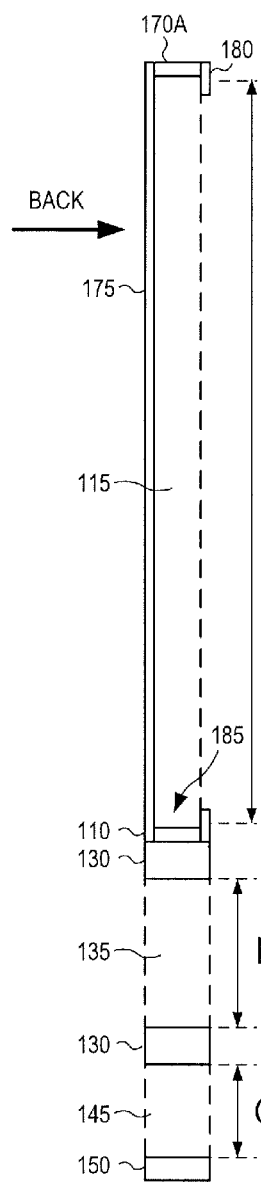
FIG. 3A is a cross-sectional view of the case of FIG. 1A along line III-III'.

FIG. 3A is a cross-sectional view of the case of FIG. 1A along line III-III'. As shown in FIG. 3A, the tablet cavity 115 is defined by a back plane including the back portion 175, the side portions 170, and a front plane defined by rubber lip 180. A tablet computer can be inserted into the tablet cavity 115 by a user manually deforming the rubber lip 180 allow the tablet computer past the rubber lip 180.

Figure 3B:
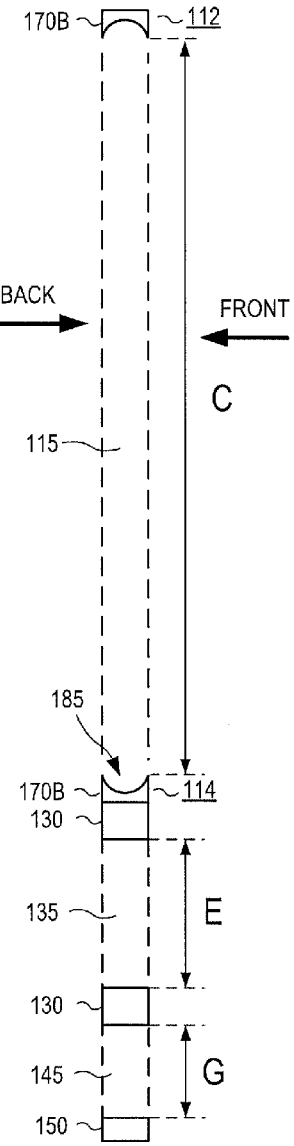
FIG. 3B is a cross-sectional view of the case of FIG. 1B along line III-III'.

FIG. 3B is a cross-sectional view of the case of FIG. 1B along line III-III'. As shown in FIG. 3A, the tablet cavity 115 is defined by a back plane, a front plane, and the side portions 170.

Figure 3C:
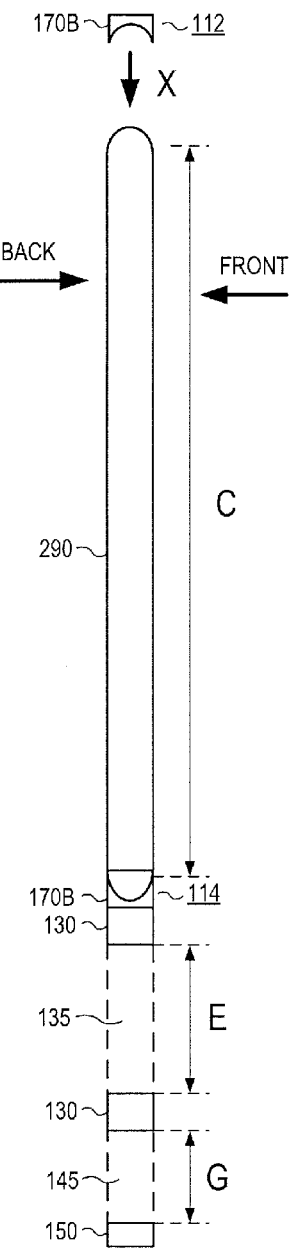
FIG. 3C is a cross-sectional view of the case of FIG. 1B along line III-III'showing how a tablet computer could be secured within it.

FIG. 3C is a cross-sectional view of the case of FIG. 1B along line III-III' showing how a tablet computer could be secured within it. In particular, FIG. 3C shows how the upper part 112 of the tablet holding unit 110 is detached and the tablet computer 290 is inserted in the tablet cavity 115 to engage its bottom edge with the side portion 170B of the lower part 114 of the tablet holding unit 110. The upper part 112 of the tablet holding unit 110 is then moved in a direction X such that side portion 170B of the upper part 112 of the tablet holding unit 110 engages with an upper edge of the tablet computer 290.

As shown in FIGS. 3B and 3C, the tablet securing unit 110 is configured such that when it contains the tablet computer 290, a back of the tablet computer 290 is flush with the rest of a corresponding sides of the case 100. In this way, the case 100 can be put down on a surface when the tablet computer 290 is inside and it will lay flat on that surface.

As shown in FIGS. 3A-3C, the side portions 170 can have different shapes. For example in the embodiment disclosed in FIG. 3A, the side portions 170 have a first shape 170A, while in the embodiments disclosed in FIGS. 3B and 3C, the side portions 170 have a second shape 170B.

The first shape 170A is flat. Such a flat shape is permissible in this disclosed embodiment because the side portions 170 need only prevent the tablet computer from moving horizontally (i.e., up and down in FIG. 3A). The back portion 175 and the rubber lip 180 will prevent the tablet computer from moving vertically (i.e. left and right in FIG. 3A).

The second shape 170B is curved. This curved shape is configured to cradle the edges of the tablet computer to prevent it from moving both vertically and horizontally. The tablet computer will rest in the curve, the back of the curve will prevent it from moving horizontally in one direction, and the edges of the curve will prevent it from moving vertically in either direction.

In alternate embodiments, however, the shape of the side portions 170 may vary with the contour of the edge of the tablet computer that the case 100 is designed to be used with. For example, the shape of the side portions 170 may be squared, triangular, etc. If there is no back portion 175 or rubber lip 180, however, the shape of the side portions 170 must provide both vertical and horizontal support for the tablet computer. The side and back portions 170 and 175 in the first disclosed embodiment can be arranged to conform with the shape of the edge of the tablet computer; and the side portions 170 and rubber lip 180 in the first disclosed embodiment can be arranged to conform with the shape of the edge of the tablet computer.

In still other alternate embodiments, the side portions 170 may be made of a soft material that will form around the contour of the edge of the tablet computer. In this way, multiple types of tablet computer could be provided with a single case 100.

Figures 4A, 4B, 4C:
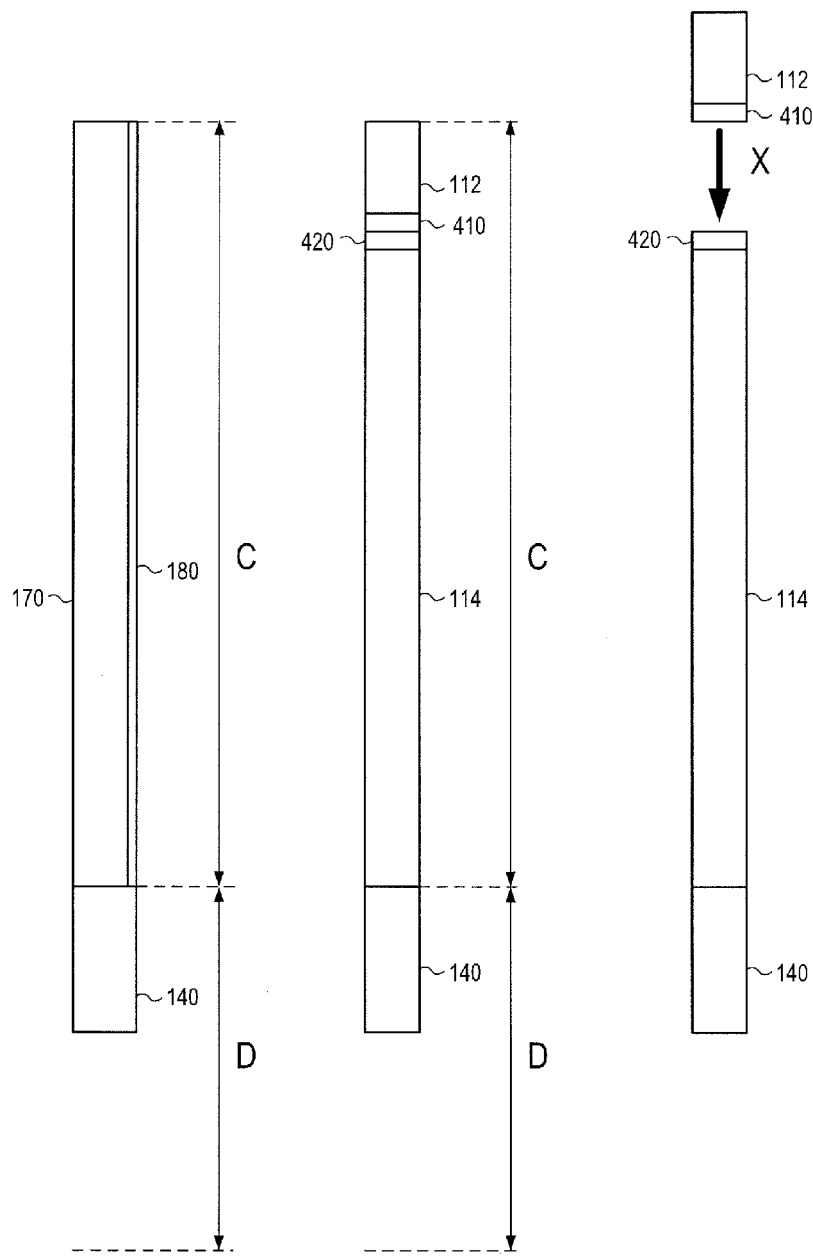
FIG. 4A is a cross-sectional view of the case of FIG. 1A along line IV-IV.
FIG. 4B is a cross-sectional view of the case of FIG. 1B along line IV-IV'.
FIG. 4C is a cross-sectional view of the case of FIG. 1B along line IV-IV' showing how a tablet computer could be secured within it.

FIG. 4A is a cross-sectional view of the case of FIG. 1A along line IV-IV'. As shown in FIG. 4A, the rubber lip 180 is formed along the entire front edge of the side portion 170.

FIG. 4B is a cross-sectional view of the case of FIG. 1B along line IV-IV'. As shown in FIG. 4B, the upper part 112 of the tablet securing unit 110 and the lower part 114 of the tablet securing unit 110 are connected together using attachment mechanisms 116 and 118.

FIG. 4C is a cross-sectional view of the case of FIG. 1B along line IV-IV' showing how a tablet computer could be secured within it. In particular, FIG. 4C shows how the upper part 112 of the tablet holding unit 110 is detached to allow the tablet computer 290 to be inserted in the tablet cavity. Then, the upper part 112 of the tablet holding unit 110 is then moved in a direction X such that the upper attachment mechanism 116 engages with the lower attachment mechanism 118, thereby securing the upper part 112 of the tablet holding unit one 110 to the lower part 114 of the tablet holding unit one 110.

Figure 5A:
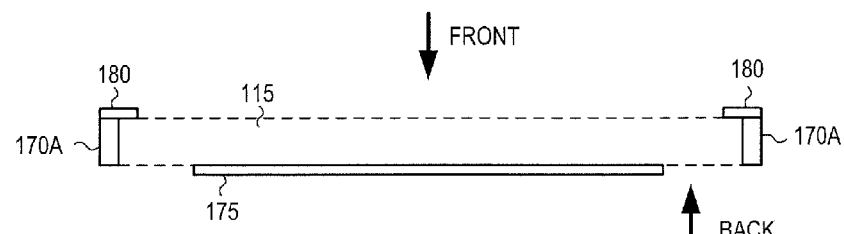
FIG. 5A is a cross-sectional view of the case of FIG. 1A along line V-V''.

FIG. 5A is a cross-sectional view of the case of FIG. 1A along line V-V'. As shown in FIG. 5A, the tablet cavity 115 is defined by a back plane including the back portion 175, the side portions 170, and a front plane defined by rubber lip 180. A tablet computer can be inserted into the tablet cavity 115 by a user manually deforming the rubber lip 180 allow the tablet computer past the rubber lip 180.

Figure 5B:
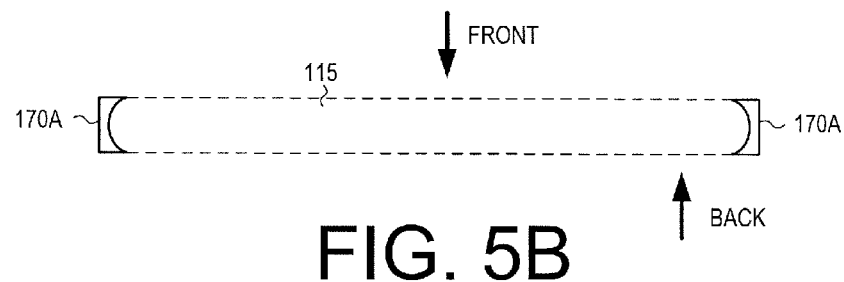
FIG. 5B is a cross-sectional view of the case of FIG. 1B along line V-V'.

FIG. 5B is a cross-sectional view of the case of FIG. 1B along line V-V'. As shown in FIG. 5B, the tablet cavity 115 is defined by a back plane, a front plane, and the side portions 170.

As with FIGS. 3A-3C, FIGS. 5A and 5B show that the side portions 170 can have different shapes. For example in the embodiment disclosed in FIG. 5A, the side portions 170 have the first shape 170A, while in the embodiment disclosed in FIG. 5B, the side portions 170 have the second shape 170B.

The first shape 170A is flat. Such a flat shape is permissible in this disclosed embodiment because the side portions 170 need only prevent the tablet computer from moving horizontally (i.e., left and right in FIG. 5A). The back portion 175 and the rubber lip 180 will prevent the tablet computer from moving vertically (i.e. up and down in FIG. 5A).

The second shape 170B is curved. This curved shape is configured to cradle the edges of the tablet computer to prevent it from moving both vertically and horizontally. The tablet computer will rest in the curve, the back of the curve will prevent it from moving horizontally in one direction, and the edges of the curve will prevent it from moving vertically in either direction.

In alternate embodiments, however, the shape of the side portions 170 may vary with the contour of the edge of the tablet computer that the case 100 is designed to be used with. For example, the shape of the side portions 170 may be squared, triangular, etc. If there is no back portion 175 or rubber lip 180, however, the shape of the side portions 170 must provide both vertical and horizontal support for the tablet computer.

In still other alternate embodiments, the side portions 170 may be made of a soft material that will form around the contour of the edge of the tablet computer. In this way, multiple types of tablet computer could be provided with a single case 100.

Figure 6:
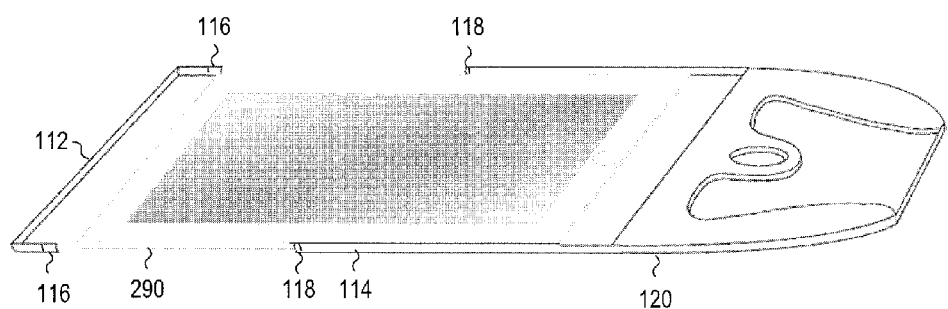
FIG. 6 is a perspective view showing how a tablet computer could be secured within the case of FIG. 1B according to a disclosed embodiment of the present invention.

FIG. 6 is a perspective view showing how a tablet computer could be secured within the case of FIG. 1B according to a disclosed embodiment of the present invention. As shown in FIG. 6, the upper part 112 of the tablet holding unit 110 is initially removed. The tablet computer 290 is then slid into the portion of the tablet cavity 115 defined by the lower part 114 of the tablet holding unit 110. Then, the upper part 112 of the tablet holding unit 110 is moved back into place, and reattached the lower part 114 of the tablet holding unit one 110 upper and lower securing mechanisms 116 and 118.

Figure 7:
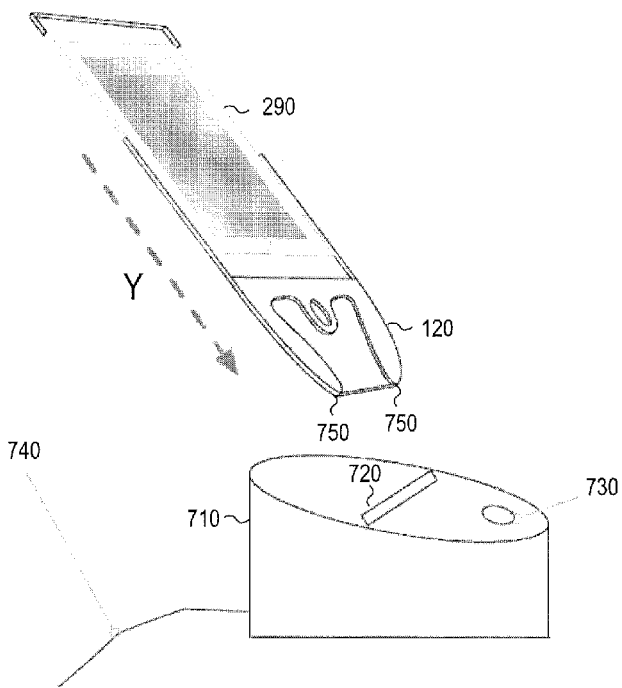
FIG. 7 is a perspective view of the case of FIG. 1B being inserted into a docking bay or charging station according to a disclosed embodiment of the present invention.

FIG. 7 is a perspective view of the case of FIG. 1B being inserted into a docking bay or charging station according to a disclosed embodiment of the present invention. As shown in FIG. 7, a docking station 710 can be provided to allow the tablet computer 290 to connect with another computer without being taken out of the case 100. The docking station 710 includes a docking sleeve 720, a docking button 740, and a connection court 740.

The docking sleeve 720 is configured to receive the handling unit 120. In some embodiments, the docking sleeve 720 can be deep enough that the actual docking connector of the tablet computer 290 can make contact with a corresponding docking connector on the docking station 720. In other embodiments, the handling unit 120 can be connected to the docking connector on the tablet computer 290 and can provide an electronic connection between the docking connector on the tablet computer 290 and a docking connector on the docking station 710. One way this could be achieved is by having connectors 750 at the tips of one or more of the handgrips 140 that would be electronically connected to the docking connector on the tablet computer 290.

Figure 8:
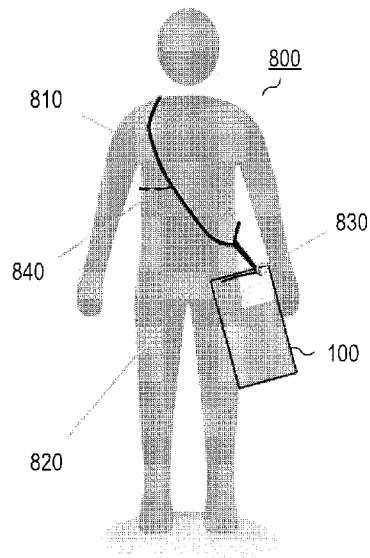
FIG. 8 is a drawing showing how the case of FIGS. 1A, 1B, and 2 can be held over a person's shoulder using a shoulder strap mechanism according to a disclosed embodiment.

FIG. 8 is a drawing showing how the case of FIGS. 1A, 1B, and 2 can be held over a person's shoulder using a shoulder strap mechanism according to disclosed embodiments. As shown in FIG. 8, a strap configuration 800 can include a shoulder strap 810, extension line 820, an attachment mechanism 830, and a stabilizing strap 840.

The shoulder strap 810 is a length of cord or strapping configured to rest easily over the shoulder of a user. In some embodiments there may be some padding where the shoulder strap 810 is intended to rest on the user shoulders.

The extension line 820 is the length of cord or strapping that connects between a portion of the shoulder strap 810 that would rest at the user's hip, and the case for the tablet computer 100. In some embodiments it may be directly connected to the shoulder strap 810. In others, it may be freely movable along a length of the shoulder strap.

The attachment mechanism 830 is configured to attach the extension line 820 to the case 100. In some embodiments, the attachment mechanism 830 could be a metal or plastic loop connected through a hole in one of the handgrips 140. In other embodiments it could be a metal or plastic loop that is placed around the handle 150 when the handle 150 is unlatched. In still other embodiments it could be a carabiner that pokes between the handle 150 and loop on the extension line 820. Other means of attachment are also possible.

The stabilizing strap 840 is a length of cord or strapping that is configured to connect between a first portion of the shoulder strap 810 that passes along the users back and a second portion of the shoulder strap 810 that passes along the user's chest. The stabilizing strap 840 is further configured to pass along the user's side, under his or her arm. The stabilizing strap 840 prevents the shoulder strap 810 from moving too far from its original position.

In operation, the combination of elements in the case 100 will provide for an effective user experience and an efficient way to use the tablet computer 290 continually or periodically. The strap configuration 800 allows a tablet computer to be carried easily, but with ready access. The tablet is always at the user's side, but can be allowed to hang unused for as long as necessary. There is no chance of leaving it unattended or forgetting to pick it up once it's put down.

Furthermore, whenever the tablet computer 290 is needed, the user need only pick it up by the handle 150 or one of the hand grips 140 to bring it into position. A top of the case 100 can then be nestled in the crook of the user's elbow, and the user's thumb or one or more fingers can be slipped through the hole 135 in the palette grip 130. This will give a secure hold on the case and place the tablet in a position where it can easily be used. Furthermore, this secure grip is obtained with only one arm, leaving the other arm and hand free to operate the tablet computer.

In addition, when a user is finished using the tablet computer 290, he may simply let the tablet drop, and it will fall back into position along the user's side, ready for the next time it is needed. In this way, the tablet computer can used very efficiently.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A case for a tablet computer, comprising:
   a tablet securing unit configured to hold a tablet computer in a tablet cavity;
   one or more hand grips on a first end of the tablet securing unit, the one or more hand grips extending from the tablet securing unit;
   a palette grip located in the middle of the first end of the tablet securing unit and extending from the tablet securing unit, the palate grip having a hole formed in it;
   a handle connected to the one or more hand grips;
   a support element formed on a back side of the tablet securing unit, the support element being configured to support the tablet computer; and
   a rubber lip formed on a front side of the tablet securing unit around a periphery of the tablet cavity, the rubber lip being configured to hold the tablet computer in the tablet cavity against the support element.

2. The case of claim 1, wherein
   the tablet securing unit and the support element are configured such that when the tablet computer is placed in the tablet cavity, a bottom of the tablet computer is flush with the support element.

3. The case of claim 1, further comprising
   One or more external docking connectors located on a tip of the one or more hand grips, the one or more external docking connectors configured to connect to a docking station.

4. The case of claim 1, wherein
   the one or more hand grips have a length between 3 and 5 inches, and an average width of between 0.5 and 1.5 inches.

5. The case of claim 1, wherein
   the hole has a length between 1 and 2 inches, and a width of between 0.5 and 1.5 inches.

6. The case of claim 1, further comprising
   a tablet docking connector formed along a periphery of the tablet securing unit, the tablet docking connector being configured to connect to a tablet docking port on the tablet computer.

7. The case of claim 1, wherein
   the one or more hand grips comprise first and second hand grips,
   the first hand grip is formed on a first side of the first end of the tablet securing unit,
   the second hand grip is formed on a second side of the first end of the tablet securing unit, and
   the handle is formed between the first hand grip and the second hand grip.

8. The case of claim 1, wherein
   the handle is secured to the first hand grip by a hinge element, and
   the handle is configured to be releasably attached to the second hand grip by a latching element.

9. A tablet computer unit comprising a tablet computer secured in the case for a table computer of claim 1.

10. The case of claim 1, further comprising
    a shoulder strap connected to the handle, the strap being configured to hang over a shoulder of a person.

11. The case of claim 1, further comprising
    a stabilizing strap that is shorter than the shoulder strap, the stabilizing strap being connected between two points of the shoulder strap.

12. A case for a tablet computer, comprising:
    a tablet securing unit configured to hold a tablet computer in a tablet cavity, the tablet securing unit being formed of separate first and second portions, the first and second portions defining the tablet cavity;
    a securing mechanism configured to secure the first portion to the second portion;
    one or more hand grips projecting from the first portion of the tablet securing unit;
    a palette grip located in the middle of one end of the first portion of the tablet securing unit and extending from the tablet securing unit, the palate grip having a hole formed in it; and
    a handle connected to the one or more hand grips,
    wherein at least a portion of a sides of the first and second portions of the tablet securing unit are configured such that the portion of the sides facing the tablet cavity conforms with a contour of the tablet computer placed within the tablet cavity.

13. The case of claim 12, wherein
    the tablet securing unit is configured such that when the tablet computer is placed in the tablet cavity, a bottom of the tablet computer is flush with a bottom of the tablet securing unit.

14. The case of claim 12, further comprising
    one or more external docking connectors located on a tip of the one or more hand grips, the one or more external docking connectors configured to connect to a docking station.

15. The case of claim 12, wherein the one or more hand grips have a length between 3 and 5 inches, and an average width of between 0.5 and 1.5 inches.

16. The case of claim 12, wherein the hole has a length between 1 and 2 inches, and a width of between 0.5 and 1.5 inches.

17. The case of claim 12, further comprising a tablet docking connector formed along a periphery of the tablet securing unit, the tablet docking connector being configured to connect to a tablet docking port on the tablet computer.

18. The case of claim 12, wherein
the one or more hand grips comprise first and second hand grips,
the first hand grip is formed on a first side of the first end of the tablet securing unit,
the second hand grip is formed on a second side of the first end of the tablet securing unit,
the handle is formed between the first hand grip and the second hand grip.

19. The case of claim 12, wherein
the handle is secured to the first hand grip by a hinge element, and
the handle is configured to be releasably attached to the second hand grip by a latching element.

20. The case of claim 12, further comprising a shoulder strap connected to the handle, the strap being configured to hang over a shoulder of a person.

21. The case of claim 12, further comprising a stabilizing strap that is shorter than the shoulder strap, the stabilizing strap being connected between two points of the shoulder strap.

22. A tablet computer unit comprising a table computer secured in the case for a table computer of claim 12.

* * * * *